TELEVISION SYSTEM EMPLOYING HORIZONTAL DOT INTERLACING

Filed July 22, 1950 2 Sheets-Sheet 1

INVENTOR.
ROBERT C. MOORE
BY
Brown, Denk & Synnestvedt
AGENTS

TELEVISION SYSTEM EMPLOYING HORIZONTAL DOT INTERLACING

Filed July 22, 1950 2 Sheets-Sheet 2

INVENTOR.
ROBERT C. MOORE
BY
Brown, Denk & Synnestvedt
AGENTS

United States Patent Office 2,801,278

Patented July 30, 1957

2,801,278

TELEVISION SYSTEM EMPLOYING HORIZONTAL DOT INTERLACING

Robert C. Moore, Erdenheim, Pa., assignor to Philco Corporation, Philadelphia, Pa., a corporation of Pennsylvania Application July 22, 1950, Serial No. 175,438

14 Claims. (Cl. 178—5.4)

The present invention relates to a television system in which the reproduced image is composed of a plurality of discontinuous areas, or dots, which are interlaced in both horizontal and vertical directions. More particularly, the invention is directed to a method and means for bringing about an improved type of horizontal interlacing operation by periodically varying the phase of the sync pulses produced by the line-scanning generator at the transmitter while the phase of the dotting signal remains substantially constant.

With respect to television systems in general, a distinction may be made between (1) the order in which image information is sent through a transmission channel, and (2) the sequence in which the image is dissected by the camera tube and reconstructed at the receiver. The most obvious example of this procedural dissimilarity is the standard vertical line-interlacing process, by means of which picture content information is transmitted in what may be termed 525 groups for each complete picture, with one group following regularly after the preceding group in time. However, due to a two-by-one vertical interlacing of display (this term including both camera and image-reproducing tube actions) the second 262½ groups of information are physically interleaved with the first 262½ groups.

That the above process may be extended still further is disclosed in a copending United States patent application Serial No. 139,928, filed January 21, 1950, by W. P. Boothroyd and E. M. Creamer, Jr. In this application, it is shown that the integrating properties of the image-reproducing cathode-ray tube may be utilized in full to produce a final display which has the appearance of containing separate pieces of information separated by one-sixteenth of a microsecond in time, even though this information is transmitted through a four megacycle channel which normally limits the time-separation of the individual pieces of information within a line group to at least one-eighth of a microsecond if crosstalk is not to be encountered. It is thus clear that the appearance of the final display may have properties which are separate and distinct from the properties of the information sequence in the transmission channel.

In accordance with the Boothroyd and Creamer patent application above-mentioned, a series of dots, or pulses, of video signal are obtained in which the amplitude of each pulse is determined by the ordinate of the video signal at the precise instant at which the pulse is developed. In one embodiment, the rate at which these pulse samples are obtained is at least as high as the maximum frequency of the video signal. The pulse train is then passed through a filter having a cut-off at substantially one-half the pulse repetition frequency, so that the output of the filter is a wave characterized by having instantaneous amplitude levels corresponding to those of the pulse samples at discrete, equally-spaced time instants only. This wave is then employed to modulate a conventional television transmitter. At the receiver the signal wave is detected, sampled in synchronism with the sampling operation at the transmitter so as to derive the original pulse train, and applied to some integrating means such as a cathode-ray tube to effect a reproduction of the original image.

In one embodiment of the invention disclosed in the Boothroyd and Creamer application, there is an arbitrary, but fixed, number of dots per line. Hence, in order to obtain horizontal interlacing of these dots, the phase of the transmitter sampling wave is reversed at a 15-cycle rate, or, in other words, every one-thirtieth of a second. For such a mode of operation, the deflection repetition rates must remain substantially constant, so that the dotting signal is periodically reversed in phase relative to the horizontal synchronizing pulses. Obviously the phase of the sampler at the receiver must likewise be changed every one-thirtieth of a second to reproduce effectively the transmitted information. Of course, if the number of dots per line is chosen so that this number is not an integral multiple of the horizontal frequency, then some form of interlacing will be obtained automatically. This will be true, for example, where there are $n+½$ dot periods in each line-scanning period. However, a pattern developed in this manner may have a number of objectionable features, among which is the illusion of "crawl," or steady progression in one direction, produced by the linear movement of successively presented dots. Still further, many desirable dot patterns are not obtainable merely by this expedient of selecting a particular relationship between line and dot frequencies.

It has been found that it is unnecessary to change the phasing of the samplers at the transmitter and receiver in order to obtain horizontal dot interlacing of the type which is not inherently brought about by a particular relationship of line and dot frequencies. Instead, all of the components required to bring about a periodic horizontal shifting of dot position so as to produce any predetermined dot pattern may be incorporated in the transmitting apparatus itself, without any material increase either in its complexity or cost. This is achieved, in one embodiment, by transposing the former mode of operation (in which the dot signal phase was periodically changed relative to a constant horizontal sync pulse time position) and so designing the transmitting apparatus that the dotting signal maintains a constant-phase status while the timing of the horizontal sync pulses is slightly altered to secure the particular display pattern desired. In one example suitable for either color or monochrome systems, an effective 90° phase shift is secured every one-sixtieth of a second by permitting the dotting signal to remain unchanged in phase and then advancing or retarding the horizontal sync pulse position by one-quarter the dot frequency period. In other words, during a given interval of one-sixtieth of a second, the normal, or standard, time position of the sync pulses is transmitted, while during the next succeeding interval of one-sixtieth of a second the time position of each horizontal synchronizing pulse is shifted by one-quarter the dot frequency period so as to shift the position of the dots in the display by one-quarter of their horizontal spacing. In a four megacycle system with eight megacycle dotting, this time increment would amount to one-thirty-second of a microsecond. It has been found in practice that no difficulty is experienced in causing the receiver to correct its display timing during the vertical blanking period in response to the sync pulse shifting, and that either impulsive or AFC sync systems will track the shifting without difficulty, following which they operate normally at the new timing.

One object of the present invention, therefore, is to provide an improved television method and apparatus which is particularly adapted to the reproduction of an image by means of discontinuous areas or dots which are interlaced in both horizontal and vertical directions.

An additional object of the present invention is to provide a dot television system, of the nature set forth, in which no apparatus is required at either the transmitter or the receiver for periodically shifting the phase of the dot signal so as to obtain an improved type of horizontal interlacing thereof.

A further object of the invention is to provide a dot television system, of the nature set forth, in which the dot signal remains substantially constant in frequency and unswitched in phase, while the horizontal synchronizing pulses are caused periodically to vary their timing thereby to secure a desired image-reproduction pattern at the receiver.

Other objects and advantages will be apparent from the following description of a preferred form of the invention and from the drawings, in which:

Figure 2(*b*) also illustrates a portion of a receiver image rastera rea, showing one form of dot pattern obtainable by methods known in the art.

Figure 1:
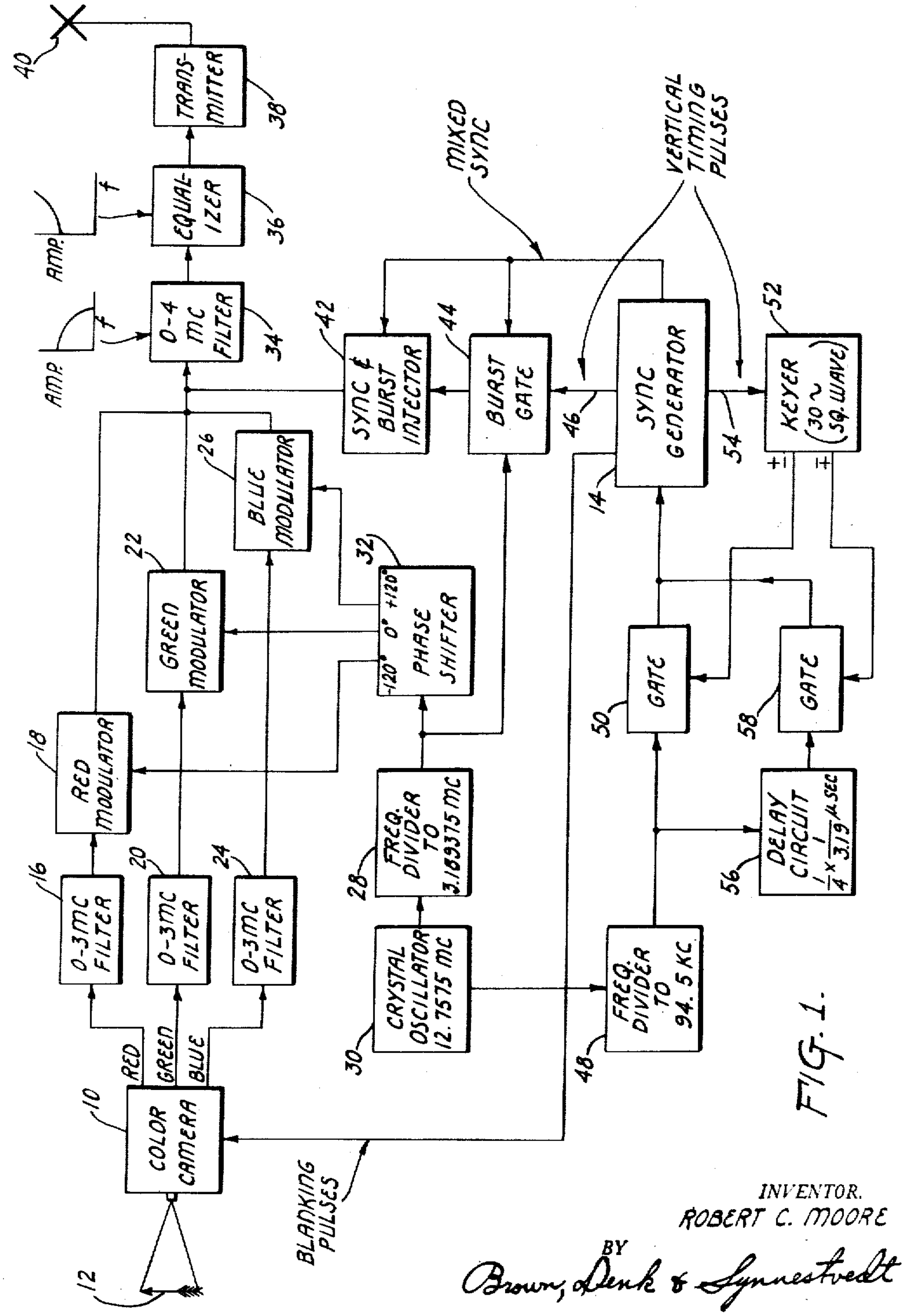
Figure 1 is a block diagram of one form of television transmitter constructed in accordance with the principles of the present invention.

Referring now to Figure 1, there is shown a system for transmitting images so that they may be received and reproduced in their natural colors. However, the color television system to be described herein is merely one embodiment of the inventive concept, and it is to be understood that the principles of the invention are fully applicable to television arrangements in which an image is transmitted and received for reproduction in monochrome. The particular omissions and changes to be made in the system of Figure 1 to adapt it for black-and-white transmission will be fully set forth hereinafter.

A color camera 10 is focused upon an object 12 of which a color representation is to be transmitted and reproduced. The camera 10 operates to develop in the output thereof three component-color signals, such, for example, as red, green and blue. Since camera 10 may be of a type now known in the art, it has been shown by a labeled rectangle in order to simplify the drawing, although it might include three separate pick-up tubes of the "orthicon" type each of which operates on a standard 60-field 30-frame basis. It is supplied with horizontal and vertical blanking pulses in the usual manner from a synchronizing generator 14, so that each of the component-color signals in the output of camera 10 is a complete video waveform with the exception of horizontal and vertical synchronizing pulses.

The component-color camera signal in the red channel passes through a filter 16, and is then applied to a modulating unit which is indicated by the reference numeral 18. The filter 16 is designed to have a passband from zero frequency to approximately 3 megacycles. In a similar manner the component-color camera signal in the green channel is applied through a filter 20 to a modulator 22, and the corresponding blue signal is applied through a filter 24 to a modulator 26. In order that these three component-color signals be successively sampled at equally-spaced time instants, a gating, or sampling, wave having a frequency of 3.189375 megacycles (hereinafter designated for convenience as 3.19 megacycles) is developed by a frequency divider 28 which is connected to the output of a crystal oscillator 30 operating at some suitable multiple frequency such as 12.7575 megacycles. The 3.19 megacycle sampling wave from the frequency divider 28 passes through a phase shifting unit 32, which acts to provide three output waves, each of which is displaced in phase by approximately 120°. These three out-of-phase voltage variations are respectively applied to the modulators 18, 22 and 26 so as to activate the latter in timed sequence. The outputs of the modulators are combined to form a composite pulse train for application to a low-pass filter 34, the pulses of this composite train thus occurring at a rate of approximately 9.567 megacycles per second.

The filter 34 is designed to have a passband from zero frequency to approximately four megacycles, with a sharp cut-off at the latter point. The output of the filter 34 is applied to an equalizer unit 36 which acts as a phase and amplitude corrector. The two units 34 and 36 in combination have the property of passing sampled information at a maximum rate of 8 million samples per second without appreciable crosstalk between adjacent pulses. Amplitude versus frequency curves for these units are set forth in the drawing, although the response of each unit is of course chosen in view of the particular operating characteristics of the system. The output of the equalizer 36 is then applied to modulate a standard television transmitter 38 which is connected to antenna 40. It will be understood that, if desired, the equalizer unit 36 may be of the type shown in a copending United States patent application of W. P. Boothroyd, filed January 14, 1949, as Serial No. 70,951, now Patent No. 2,680,151 granted June 1, 1954.

The sampling circuit, which includes the modulators 18, 22 and 26 of Figure 1, must operate in synchronism with a corresponding sampling device at the receiver in order to avoid distortion of the reproduced image. The means for coordinating the operation of the two samplers includes a sync and burst injector unit 42 and a burst gate 44, each of which is connected to the synchronizing generator 14 in such a manner that the unit 44 opens during a portion of each horizontal blanking interval and thus permits the passage therethrough of the 3.19 megacycle wave developed by the frequency divider 28. By this mode of operation, a burst of high-frequency energy is applied through the injector 42 to the input of filter 34 during horizontal blanking when no video signal is being received from the camera 10. As brought out in copending application Serial No. 139,928 above-mentioned, this periodic burst of high-frequency energy is utilized for synchronizing the operation of the receiver sampling apparatus. In addition, a vertical timing pulse is obtained from the sync generator 14 and applied to the burst gate 44 over a connection 46, so that the 3.19 megacycle output of the frequency divider 28 is prevented from entering the video circuit during the vertical equalizing and blanking pulse periods. Otherwise, the burst energy may adversely affect the vertical synchronizing process at the receiver. Dual energized gates applicable to the system of the invention and which are capable of being opened by a first signal, such as a horizontal timing pulse, and are maintained closed, even in the presence of the first signal, by a second signal, such as a vertical timing pulse, are well known. Representative circuits capable of operating in this manner may be found in volume 19 of the Radiation Laboratory Series, published by McGraw-Hill Book Company, New York, 1949, at page 381, et seq.

In application Serial No. 139,928 it was stated that the phase of the 3.19 megacycle sampling wave may be reversed at a 15-cycle rate at the transmitter (during vertical retrace) in order to reverse the phase of the receiver sampler and hence obtain horizontal interlacing of the dot information. In other words, by such an expedient the matrix of points at which information is extracted from the original scene and reproduced on the display cathode-ray tube may be shifted horizontally, by an amount equal to one-half the distance between the centers of adjacent dots in the picture produced during one field, during every other vertical blanking interval. In accordance with the present invention, however, the phase of the 3.19 megacycle wave as applied to the filter 34 through the burst gate 44 remains constant, and instead the synchronizing pulse output of the sync generator 14 is caused to vary periodically in a manner which will now be described.

It has been stated above that the color camera 10 is supplied with blanking pulses directly from the sync generator 14, and also that the latter acts to control the burst gate 44, opening and closing such unit so that injection of the high-frequency 3.19 megacycle energy into the video circuit occurs preferably during that portion of each horizontal blanking interval which follows the horizontal synchronizing pulse itself. Furthermore, as shown in Figure 1, the mixed sync pulses are applied directly to the filter 34 from the generator 14 through the sync and burst injector 42. These mixed sync pulses, as above brought out, also control in part the gating operation of the burst gate 44.

It is desirable that the operation of the sync generator 14 be locked in with the operation of the crystal oscillator 30 which provides the high-frequency dotting wave through the frequency divider 28. This is brought about by feeding a portion of the output of the oscillator 30 to a further divider 48, which reduces the frequency of the 12.7575 megacycle wave to a value of 94.5 kilocycles. The generator 14 is connected to the divider 48 through a gate 50, so that, when the latter is open, both the frequency and phase of the sync pulses from generator 14 are determined by the wave from divider 48. In this connection it will be noted that the horizontal sync pulses produced by generator 14 occur at a frequency of 15.75 kc./sec. for a 525 line image as above specifically described. This horizontal scanning frequency is the sixth sub-harmonic of the 94.5 kc./sec. wave from the divider 48. Similarly, the vertical sync pulses produced by generator 14 occur at a frequency of 60 c./sec. for the 60 field image herein considered. This vertical scanning frequency is the 1575 sub-harmonic of the 94.5 kc./sec. wave from the divider 48. Since the frequencies of both signals to be produced by the generator 14 are in direct harmonic relationship to the frequency of the wave of divider 48, the latter wave serves as a frequency and phase synchronizing signal for the horizontal and vertical sync pulse producing systems of the generator 14. It is apparent that when a signal from the divider 48 is delayed in its transit to the generator 14 by an appropriate delay line such as the circuit 56, a corresponding delay will be effected in the signals produced by the generator 14 so that by alternately applying undelayed and delayed signals to the generator 14 from the divider 48 by means of the gates 50 and 58, the sync signals produced by the generator 14 will similarly be undelayed and delayed in the sequence of the operation of the gates 50 and 58.

In order to bring about modifications of horizontal dot interlacing in accordance with the present invention without periodically shifting the phase of the 3.19 megacycle wave output of the divider 28, it is necessary that the time relation between this sampling wave and the sync pulses be periodically varied through control of the sync generator 14. If the timing of the sync pulses produced by the generator can be shifted at a 30 cycle rate, then the desired relationship between the sync pulses and the sampling wave will be established. Consequently, there is provided a keyer unit 52, which actually is a 30-cycle square wave generator coordinated with the sync generator 14 by means of vertical timing pulses obtained from the latter over connection 54. The keyer 52 is designed to produce two 180° out-of-phase square waves which change in polarity every one-sixtieth of a second.

Connected to the output of the frequency divider 48 is a delay circuit 56, which acts to provide a delay interval equal to one-quarter the period of the dot frequency. For a system such as described above, this period of delay amounts to approximately $\frac{1}{12.76}$ microsecond. The wave output of the delay circuit 56 is then applied to the sync generator 14 through a gate 58. Each sync pulse from the generator 14 thus has the same time relation with respect to a particular pulse received through gate 58 from the delay circuit 56 that it has with respect to this same pulse when the latter is received directly from divider 48 through the gate 50.

As shown in the drawing, the keyer 52 operates alternately to open and close the gates 50 and 58, so that the timing of the 94.5 kilocycle control wave from the divider 48 is shifted every one-sixtieth of a second correspondingly to change the time position of the sync pulses in the output of the sync generator 14 relative to that of the sampling wave from divider 28. This is equivalent to advancing the position of the dots in the image reproduced at the receiver by one-quarter of the horizontal dot spacing in alternate fields, and hence the improved interlacing is accomplished without the necessity of changing the phase of the sampling apparatus either at the transmitter or at the receiver.

Figure 2:
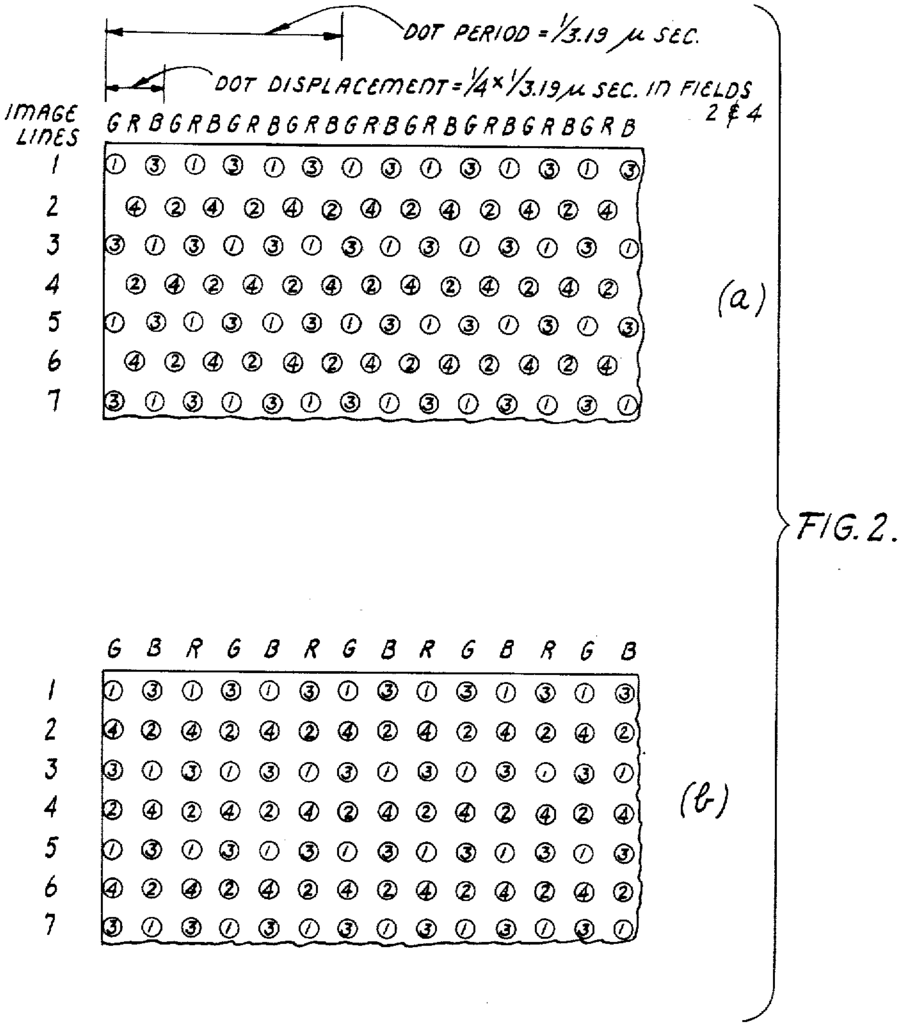
Figure 2(*a*) illustrates a portion of a receiver image raster area, showing one form of dot pattern which may be produced by selecting a particular delay period for the delay circuit of Figure 1.

The presentation on a cathode-ray tube at the receiver of the information transmitted by the apparatus of Figure 1 takes the form of an orderly arrangement of dots of light. In one embodiment of the invention, these dots, or points, of light may be so related that a pattern such as shown in Figure 2($a$) is produced. In this illustration (which includes a portion only of the complete image raster area) the cathode-ray tube screen is divided vertically into sets of green, red, and blue phosphor strips, respectively indicated by the letters G, R and B. In the first line-scanning of the image raster, the dots are discontinuously laid down in the order indicated by the numbered circles. In other words, the dots represented by a circled numeral 1 indicate those which are developed during the first field-scanning of the raster. Accordingly, it will be seen that in image line 1, for example, the first field-scanning produces dots of the colors green, red, blue, green, red, blue, and so on. With normal vertical interlacing, the third line of the raster is then scanned in a similar manner—that is, the dots are laid down in the same order blue, green, red, blue, green, red, and so on. However, only one-half of the total number of picture dots in each of these odd lines is filled in. The horizontal off-setting of the dots in successive line-scannings of the same field is due to a choice of $n+\frac{1}{2}$ dots per line, and cancels out at the end of each four successive fields.

In the second field, the second, fourth, and other even lines are scanned, with the dots occupying positions indicated by the circled numeral 2 and being developed in the same order red, blue, green, and so on. In this second field-scanning of the image raster of Figure 2($a$), however, the dots laid down are diagonally interlaced with the dots laid down during the first field. This is accomplished by horizontally shifting the dot position by one-quarter of the dot period (which, in this case, is equal to $\frac{1}{3.19}$ microsecond) so that the dot displacement horizontally in the even lines is equal to $\frac{1}{12.76}$ microsecond.

The dots or points laid down during the third field-scanning are indicated by a circled numeral 3, while the dots laid down during the fourth field-scanning are similarly designated by a circled numeral 4. At the end of four fields, therefore, a complete color picture has been reconstituted at the receiver.

It will be noted that, in the particular pattern of Figure 2($a$), the dot signals for each color fall in vertical alignment on the viewing screen. This permits the use of a colored phosphor tube designed so that the respective color phosphors are laid down in vertical strips. Furthermore, the dot pattern of Figure 2($a$) possesses better apparent definition, and a smoother overall appearance, than does a dot pattern such as illustrated in Figure 2($b$), for example, which is produced by a system other than that illustrated in Figure 1. In this arrangement of Figure 2($b$), the dots are laid down in the same order as those of Figure 2($a$) insofar as line 1 is concerned—that is, in the first field (as shown by the numbered circles) the sequence is green, red, blue, green, red, blue, and so on. Line 3 is then scanned, with the dots being interlaced insofar as horizontal position is concerned with the dots of line 1. In the second field, lines 2, 4, etc. are scanned in the same dotting sequence as shown in Figure 2($a$), but instead of being displaced horizontally with respect to the dots laid down in lines 1 and 3, the dots in lines 2 and 4 of Figure 2($b$) lie in the same vertical columns as the corresponding dots of lines 1 and 3. From an inspection of the field numbers included within the circles of Figure 2($b$), it will be seen that the dots laid down in the four successive fields have a steady progression in a vertical direction—that is, there is a constant upward movement of successive dots which the eye tends to follow, so that an illusion of "crawl" is present which has proven to be highly objectionable. Comparing Figure 2($b$) with 2($a$), it is apparent that, in the latter pattern, dots of successive fields do not lie one above the other, but instead are offset horizontally in adjacent lines. Hence, instead of a steady upward crawl, there is a side-to-side movement which has proven to be much more tolerable than the effect inherent in the arrangement of Figure 2($b$). The combination of vertical and horizontal displacement of the dots of field 2 with respect to the dots of field 1 is such that there is exact interleaving between them in a diagonal direction. This is true for any field N with respect to field $N-1$ and field $N+1$.

It will be noted that another important distinction between the patterns of Figures 2($a$) and 2($b$) is that the former has twice as many vertical columns as does the latter. This results in an image of much finer appearance, since the horizontal distance between dots of a single color is reduced by one-half. Furthermore, since the pattern structure contains equal dot spacing in all directions, there are no outstanding gaps or open areas when a picture of predominantly a single color is transmitted. In the case of the pattern of Figure 2($b$), the dots laid down during the first field define all the dot column, or strip, locations which will ever exist for that particular color. In the pattern of Figure 2($a$), however, the dots laid down during the first and third fields lie on the same vertical strips, while the dots laid down during the second and fourth fields lie on further columns which are positioned midway between the columns defined by the dots of fields 1 and 3. Thus, a smoother and more fluid image is produced in which the defects inherent in the pattern of Figure 2($b$) are no longer present to any appreciable extent.

Although the above system has been set forth in connection with the transmission and reception of colored images, it will be recognized that the principles of the invention are equally applicable to monochrome television in which images are transmitted for reproduction in black-and-white. In such an event, the dotting pattern of Figure 2($a$) remains unchanged insofar as the relative dot position is concerned, except that, of course, a color striped tube would not be employed and instead a standard white phosphor screen utilized. The same benefits would be obtained, however, as regards better apparent definition, and also with respect to a smoother and less "grainy" picture. In the transmitting apparatus of Figure 1, it is only necessary to eliminate two of the three component-color signal channels (such, for example, as the red and blue channels) leaving a single channel in which a standard black-and-white video signal is developed by the camera 10. The only change in the sampling apparatus indicated by the elements 28, 30 and 32 is that the divider 28 would reduce the 12.7575 megacycle output of the oscillator 30 to a value of 9.57 megacycles. This latter wave is then applied directly to the single modulator (such as 22) which converts the black-and-white signal output from the camera 10 into a train of pulses at this 9.57 megacycle frequency. Such a pulse train is applied to the filter 34 in the same manner as set forth above.

The only other revision in the system of Figure 1 is in the delay period of the circuit 56, which is given a value of $$\frac{1}{38.28}$$

microsecond. This change is necessary because of the fact that successive dots in each line-scanning of Figure 2($a$) now represent the same "color" characteristic of the image. Consequently, successive dots of the same "color" are now spaced apart by only one-third the distance which separates them when three actual component-colors are used. Thus, to secure a proper horizontal displacement in lines 2 and 4, the dots therein are delayed by one-third the amount of the previous example, so that they now fall one-quarter of the distance between successive dots laid down in the first field-scanning of lines 1 and 3. The appearance of the overall pattern, however, will be identical in the black-and-white system with that of the three-color system insofar as the relative position occupied by the dots over the whole raster area is concerned.

It will be obvious that other dot structures, both for black-and-white and for color, may be obtained by varying the delay period of the circuit 56 in Figure 1. For example, the horizontal sync pulse timing may be retarded by one-third of the primary dot period in fields 3 and 4 compared to the timing in fields 1 and 2. This would cause every dot of a group of four to fall on a new vertical column. While such a system would not be readily adaptable to a color system employing a color striped phosphor tube, for example, it would nevertheless be advantageous in connection with monochrome television, and also in connection with television systems in which the cathode-ray tube is provided with a number of colored phosphor dots instead of colored stripes. The position of the phosphor dots in such an event would be so chosen as to conform to the particular dot pattern which it is desired to reproduce.

Having thus described my invention, I claim:

1. A television system comprising a source of an electrical wave representative of an image and comprising consecutive horizontal line components representative of consecutive scansions of said image, means for producing time spaced samples of said wave at fixed cyclically recurring intervals, and means for varying the time phase position of one of said consecutive components relative to the time phase position of another of said components by an amount less than the interval between said time spaced samples.

2. A television system comprising a source of an electrical wave representative of an image and comprising consecutive components representative of consecutive horizontal scansions of said image, said consecutive components being arranged in consecutive groups recurring at the rate of the vertical scansions of said image, means for producing time spaced samples of said wave at fixed cyclically recurring intervals having a period smaller than the period of said horizontal scansions, and means for cyclically varying the time phase position of one of said groups of components relative to the time phase position of another of said groups of components at a rate proportional to the rate of the vertical scansions of said image and by an amount less than the interval between said time spaced samples.

3. A television system as claimed in claim 2 wherein said means for cyclically varying the time phase position of one of said groups of components relative to the time phase position of another of said group of components comprises means for cyclically varying the relative time phase position of one of said groups of components by an amount substantially equal to one-fourth of the interval between said time spaced samples.

4. A television system as claimed in claim 2 wherein said means for producing time spaced samples of said wave comprises means for producing a sampling signal having a frequency equal to an odd-harmonic multiple of one-half of the frequency of said horizontal scansions.

5. A television system comprising, means for forming an electron image representative of an optical image, means for scanning the electron image line by line to produce an electrical wave representative of said optical image and comprising consecutive components representative of consecutive line scansions of said image, means for producing time spaced samples of said components of said wave at fixed cyclically recurring intervals, and means coupled to said scanning means for varying the time phase positions of one of said consecutive components relative to the time phase position of another of said components by an amount less than the interval between said time spaced samples.

6. A television system comprising, means for forming an electron image representative of an optical image, means for scanning the electron image in horizontal and vertical directions to produce an electrical wave representative of said optical image and comprising consecutive components representative of consecutive horizontal scansions of said image, means for producing time spaced samples of said components of said waves at fixed cyclically recurring intervals, a generator of horizontal and vertical synchronizing pulses for initiating the horizontal and vertical scanning of said image, and means for cyclically varying the time phase position of one group of said horizontal synchronizing pulses by an amount less than the interval between said time spaced samples to thereby cyclically vary the time phase position of said one group of said consecutive components relative to the time phase position of another group of said consecutive components by an amount less than the interval between said time spaced samples.

7. A television system as claimed in claim 6, in which said means for cyclically varying the time phase position of the said one group of horizontal synchronizing pulses comprises means for cyclically varying the time phase position of the said one group of pulses at the repetition frequency of the vertical synchronizing pulses.

8. A television system as claimed in claim 6 further comprising means for applying said cyclically varied group of horizontal synchronizing pulses to said electrical wave in fixed time relationship to the time of occurence of said consecutive components.

9. A color television system comprising a source of a plurality of electrical waves each representative of variations of the magnitude of a given primary color component of the color content of an image and each comprising consecutive components representative of consecutive horizontal line scansions of said image, means for producing time spaced samples of said waves at fixed cyclically recurring intervals, means for combining said time spaced samples of each of said waves in sequence to produce a composite-color wave, and means for varying the time phase position of one of said consecutive components of each of said waves relative to the time phase position of another of said components of each of said waves by an amount less than the interval between said time spaced samples.

10. A color television system comprising a source of a plurality of electrical waves each representative of the variations of the magnitude of a given primary color component of the color content of an image and each comprising consecutive components representative of consecutive horizontal scansions of said image, said consecutive components of each of said waves being arranged in consecutive groups recurring at the rate of the vertical scansions of said image, means for producing time spaced samples of said waves at fixed cyclically recurring intervals, means for combining said time spaced samples of each of said waves in sequence to produce a composite color wave, and means for cyclically varying the time phase position of one of said groups of components of each of said waves relative to the time phase position of another of said groups of components of each of said waves at a rate proportional to the rate of the vertical scansions of said image and by an amount less than the interval between said time spaced samples.

11. A color television system as claimed in claim 10 wherein said means for cyclically varying the time phase positions of one of said groups of each of said waves with respect to the time phase position of the other of said groups of each of said waves comprises means for cyclically varying the relative time phase position of one of said groups by an amount substantially equal to one-fourth of the interval between the said time spaced samples.

12. A color television system as claimed in claim 11 wherein said means for producing time spaced samples of said waves comprises means for producing a sampling signal having a frequency substantially equal to an odd-harmonic multiple of one-half of the frequency of the said horizontal line scansions.

13. A color television system comprising means for forming a plurality of primary color images of an object, means for scanning the color images in horizontal and vertical directions to produce a plurality of electrical waves each representative of variations of the magnitude of the color of a respective one of said images, each of said waves comprising consecutive components representative of consecutive horizontal scansions of the respective images, said consecutive components being arranged in consecutive groups recurring at the rate of the vertical scansions of said images, means for producing time spaced samples of said waves at fixed cyclically recurring intervals, means for combining said time spaced samples of each of said waves in sequence to produce a composite color wave, a generator of horizontal and vertical synchronizing pulses for initiating the horizontal and vertical scanning of said images, means for cyclically varying the time phase position of one group of said horizontal synchronizing pulses relative to the time phase position of another group of said horizontal sync pulses at a rate proportional to the rate of the vertical scansions of said image and by an amount less than the interval between said time spaced samples, and means for supplying said cyclically varied horizontal synchronizing pulses to said horizontal scanning means to thereby cyclically vary the time phase position of one of said groups of said components of each of said waves relative to the time phase position of another of said groups of components of each of said waves, said cyclical variations recurring at a rate proportional to the rate of the vertical scansions of said images and having a value less than the interval between said time spaced samples.

14. A television system comprising, means for forming an electron image representative of an optical image, means for scanning the electron image in horizontal and vertical directions to produce an electrical wave representative of said optical image and comprising consecutive components representative of consecutive horizontal scansions of said image, means for producing time spaced samples of said components of said wave at fixed cyclically recurring intervals, a generator of horizontal and vertical synchronizing pulses for initiating the horizontal and vertical scanning of said image, and means for cyclically varying the time-phase position of one group of said horizontal synchronizing pulses by an amount less than the interval between said time-spaced samples to thereby cyclically vary the time phase position of said one group of said consecutive components relative to the time phase position of another group of said consecutive components by an amount less than the interval between said time-spaced samples, said last-named means comprising means for producing a control wave having a frequency equal to a multiple of the horizontal synchronizing pulse frequency for regulating the frequency and phase of operation of said synchronizing generator, a first gate through which said control wave is applied directly to said synchronizing generator, a delay circuit also receiving said control wave, a second gate through which the output of said delay circuit is applied to said synchronizing generator, and a keying unit designed to alternately open and close said first and second gates.

(References on following page)

References Cited in the file of this patent

UNITED STATES PATENTS

| | | |
|---|---|---|
| 2,436,516 | Larson et al. | Feb. 24, 1948 |
| 2,498,391 | Bingley et al. | Feb. 21, 1950 |
| 2,508,267 | Kasperowicz | May 16, 1950 |
| 2,547,598 | Roschke | Apr. 13, 1951 |
| 2,678,348 | Ballard | May 11, 1954 |
| 2,739,181 | Sleeper | Mar. 20, 1956 |

OTHER REFERENCES

"RCA Bulletins on Color Television and U. H. F.," article entitled "Synchronization for Color Dot Interlace in the RCA Color Television System," October 1949, 13 pages.

"Six-Megacycle Compatible High-Definition Color Television," Television, vol. VI, pages 270–290, published by RCA Review.

"Analysis of Sampling Principles," Television, vol VI, pages 291–337, published by RCA Review.

UNITED STATES PATENT OFFICE

CERTIFICATE OF CORRECTION

Patent No. 2,801,278 July 30, 1957

Robert C. Moore

It is hereby certified that error appears in the printed specification of the above numbered patent requiring correction and that the said Letters Patent should read as corrected below.

Column 3, line 25, for "rastera rea" read -- raster area --; column 7, lines 19 and 20, for "field", each occurrence, read -- Field --; column 9, line 4, for "positions" read -- position --; column 10, line 6, for the claim reference numeral "11" read -- 10 --.

Signed and sealed this 13th day of October 1959.

(SEAL)
Attest:

KARL H. AXLINE
Attesting Officer

ROBERT C. WATSON
Commissioner of Patents